United States Patent
Dawson et al.

(10) Patent No.: US 7,088,219 B2
(45) Date of Patent: Aug. 8, 2006

(54) METHOD FOR REMOTE VEHICLE IGNITION ENABLEMENT AND DISABLEMENT VIA BROADBAND ENABLED SECURITY MECHANISMS

(75) Inventors: Christopher James Dawson, Arlington, VA (US); Craig William Fellenstein, Brookfield, CT (US); Rick Allen Hamilton, Charlottesville, VA (US); Edward Noel Luddy, II, North Salem, NY (US)

(73) Assignee: International Business Machines Corporation, Armonk, NY (US)

( * ) Notice: Subject to any disclaimer, the term of this patent is extended or adjusted under 35 U.S.C. 154(b) by 272 days.

(21) Appl. No.: 10/759,937

(22) Filed: Jan. 16, 2004

(65) Prior Publication Data
US 2005/0156706 A1    Jul. 21, 2005

(51) Int. Cl.
*H04Q 9/00* (2006.01)
*H04Q 7/00* (2006.01)
*B60R 25/10* (2006.01)
*H01H 47/00* (2006.01)
*H04M 3/00* (2006.01)

(52) U.S. Cl. .................. 340/5.72; 340/7.1; 340/5.61; 340/5.62; 340/5.63; 340/5.31; 340/426.11; 340/426.16; 340/426.2; 340/993; 307/10.5; 455/420

(58) Field of Classification Search ............... 340/5.72, 340/7.1, 5.61, 5.62, 5.63, 5.31, 426.11, 426.16, 340/426.2, 993; 307/10.5; 455/420
See application file for complete search history.

(56) References Cited

U.S. PATENT DOCUMENTS

| | | | | |
|---|---|---|---|---|
| 5,276,728 | A * | 1/1994 | Pagliaroli et al. | 455/404.1 |
| 5,805,057 | A * | 9/1998 | Eslaminovin | 340/426.12 |
| 5,874,889 | A * | 2/1999 | Higdon et al. | 340/426.36 |
| 5,918,180 | A * | 6/1999 | Dimino | 455/456.3 |
| 6,011,321 | A * | 1/2000 | Stancu et al. | 307/10.5 |
| 6,028,537 | A * | 2/2000 | Suman et al. | 340/988 |
| 6,275,773 | B1 * | 8/2001 | Lemelson et al. | 701/301 |
| 6,664,888 | B1 * | 12/2003 | Bishop | 340/426.11 |
| 6,900,723 | B1 * | 5/2005 | Yamanaka et al. | 340/426.1 |
| 6,924,728 | B1 * | 8/2005 | Wisnia et al. | 340/5.31 |

* cited by examiner

*Primary Examiner*—Jeffery Hofsass
*Assistant Examiner*—Scott Au
(74) *Attorney, Agent, or Firm*—Carr LLP; Diana R. Gerhardt

(57) ABSTRACT

A method, apparatus, and computer program are provided for remotely controlling the ignition of a vehicle. A variety of conditions can be placed on the vehicle for operation, such as time or geography, from a variety of remote wireless technologies. The ignition control system is also capable of effectively learning safe zones under which the vehicle can operate. Also, the ignition control system can cease operations upon request by an owner or law enforcement.

20 Claims, 2 Drawing Sheets

METHOD FOR REMOTE VEHICLE IGNITION ENABLEMENT AND DISABLEMENT VIA BROADBAND ENABLED SECURITY MECHANISMS

BACKGROUND OF THE INVENTION

1. Field of the Invention

The present invention relates generally to vehicle enablement and disablement and, more particularly, to remotely controlling vehicle ignition enablement and disablement through various wireless technologies.

2. Description of the Related Art

Currently, there are a variety of systems that exist for vehicle protection. On Star® and LoJack® are examples of systems used to track stolen vehicles. Each of these two systems utilize a patch antenna on a vehicle to transmit and receive signals from a Global Positioning System (GPS) satellite. These services not only can provide detection of a location of a stolen vehicle, but can also allow for remote access to the vehicle if the keys are locked inside. Interactive theft deterrent systems, typically though, do not connect to the ignition system of a vehicle.

However, there are a variety of existing systems that indicate distress and/or vehicle disablement. In U.S. Pat. No. 5,805,057 by Eslaminovin ("Eslaminovin"), which is hereby incorporated by reference, a vehicle can be disabled by a distress signal that is activated though a cellular phone. In U.S. Pat. No. 5,926,086 by Escareno et al. ("Escareno"), which is hereby incorporated by reference, a vehicle is disabled through the use of a pager that can also warn the driver. However, neither Eslaminovin nor Escareno disclose the use of a wireless system to enable usage.

To date, there is no service available to remotely control a vehicle. Cars and other vehicles have elegant electronics merged with mechanical switches to operate as theft deterrents. However, these elegant electronic solutions integrated with mechanical switches typically are independent. In other words, the systems and vehicles operate independent of any external communication or other influence. Thus, the independence means that there is virtually no way to harmlessly stop the vehicle once it is taken or in motion. Invasive techniques, such as stop sticks that puncture tires, are utilized.

Because of the independence of the vehicle, a significant threat to the public is posed. There are times when thieves or owners may recklessly drive without stopping, even with police instruction. As mentioned, only invasive techniques are used to stop the vehicle. Invasive techniques, though, can cause harm to bystanders or property damage.

Therefore, there is a need for a method and/or apparatus for remotely controlling a vehicle ignition switch that addresses at least some of the problems associated with conventional methods and apparatuses associated with conventional ignition systems and antitheft devices.

SUMMARY OF THE INVENTION

The present invention provides a method and computer program for remotely controlling vehicle ignition. At least one condition for disablement is received. Also, a vehicle ignition switch is disabled.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention can be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein can be performed in either hardware or software, or some combination thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
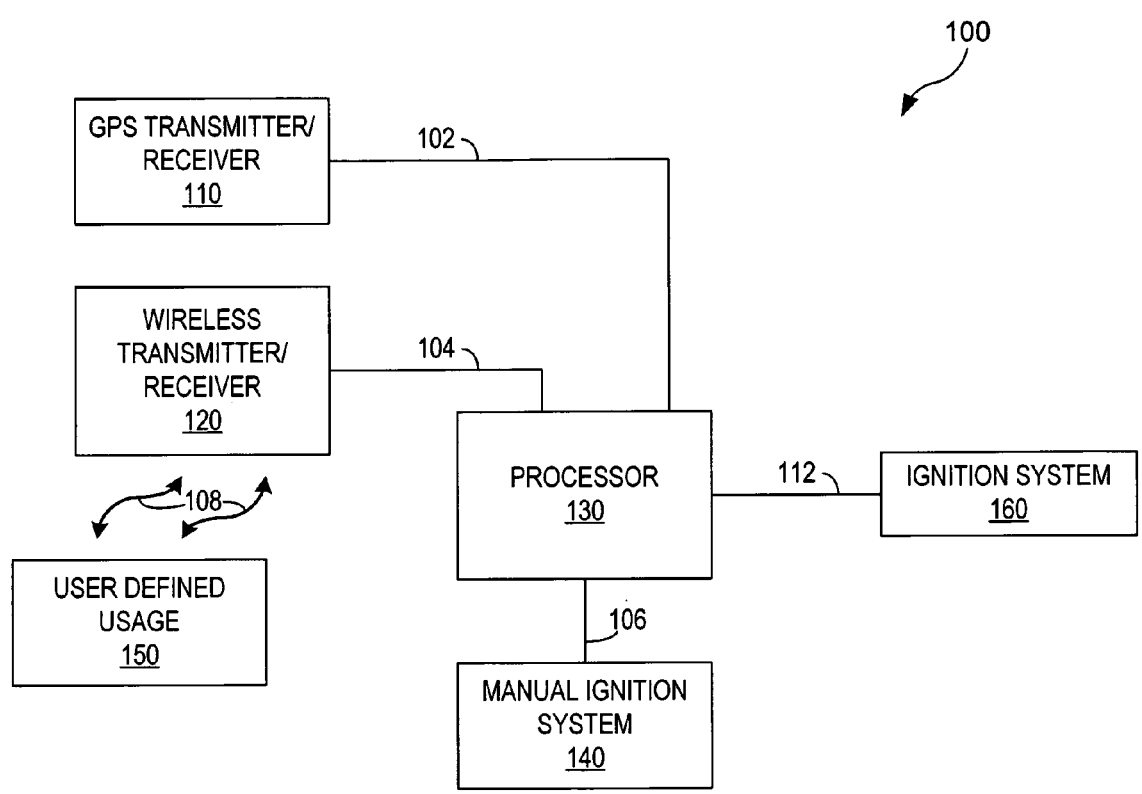
FIG. 1 is a block diagram depicting the vehicle ignition computer.

Referring to FIG. 1 of the drawings, the reference numeral 100 generally designates a block diagram depicting the vehicle ignition computer. The ignition computer 100 comprises a GPS Transmitter/Receiver 110, a wireless transmitter/receiver 120, a processor 130, a manual ignition system 140, an ignition system 160, and a user defined usage 150.

There are two modes in which the ignition computer 100 operates: proactive and reactive. In a proactive mode, a user or owner can define specific parameters under which the vehicle can operate, thereby allowing the user or owner to maintain overall control of the vehicle without the need to be physically with the vehicle. For example, if a parent is out of town, the parent can remotely define a specific time and geographical area under which a child can operate the vehicle. In the case of the proactive mode, the ignition computer 100 utilizes a logical AND function. In other words, in terms of Boolean algebra, the user defined usage 150 and the manual ignition system 140 must both be TRUE.

There are a variety of other functions that can be associated with the proactive mode. The proactive mode can either be enabled or disabled based on user desire, geography, time of allowed usage and so forth. Examples of a particular enablement or disablement are the so-called "safe zones" and "unsafe zones." An owner or user can predefine certain geographical regions in which the manual ignition switch would function therein without the need for a predefined usage. In other words, a key would turn the engine over in a safe zone. However, the processor can also be equipped to effectively be trained and to learn where safe and unsafe zones are located based on history. The processor 130 can crosscheck and historically compare the GPS-provided coordinates, the alarm system, and any other sensors that the car is equipped with to detect any potentially harmful scenarios. Essentially the computer can "learn" what zones are safe zones and anticipate potential unsafe zones.

Also, in the proactive mode there are a variety of other features that can be realized. No attempt to re-enable the vehicle using the manual ignition system 140 can cause the processor to reactivate the ignition system 160. Also, the owner of the vehicle can "check up" on the vehicle by utilizing one of the wireless/broadband access technologies that utilize the wireless transmitter/receiver 120. To accomplish this, the owner calls the vehicle and authenticates using a private key. Once authenticated, the owner contacts the vehicle and asks for status. For example, if the vehicle processor is configured to utilize a cellular network, the owner can "dial" the vehicle. The vehicle can reply with a variety of responses, such as a longitude and latitude.

In the reactive mode, the operation of the processor enabling the ignition switch is quite different. A "disable" signal is sent securely over one of the transport mediums to the vehicle, such as a satellite uplink. The vehicle can be stopped when it is safe to do so and allows for either silent mode disabling, where the driver of the vehicle is not notified, or non-silent where a warning message can be communicated to the driver of the impending stop. Law enforcement can have a database linking license plates, car Vehicle Identification Numbers (VINs), and so forth for an embedded code needed to send to the vehicle to make it stop. That way, any law enforcement vehicle can stop a vehicle fitted with a disablement system. Conversely, the database could proactively notify a law enforcement vehicle when in proximity of the suspect VIN number via message broadcast to the law enforcement vehicle.

However, in order for the ignition computer 100 to operate, a variety of connections should be made. The processor 130 is coupled to the GPS transmitter/receiver 110 through a first communications channel 102. The processor 130 is also coupled to the wireless transmitter/receiver 120 through a second communications channel 104. Also, the processor 130 is coupled to the manual ignition system 140 through a third communications channel 106. The processor is also coupled to the ignition system 160 through a fourth communications channel 112. The user defined usage 150 is coupled to the wireless transmitter/receiver 120 through a first wireless communications channel 108. Moreover, any of the aforementioned communication channels would encompass wireless links, optical links, conductor cable links, packet switched channels, direct communication channels, and any combination thereof.

Figure 2:
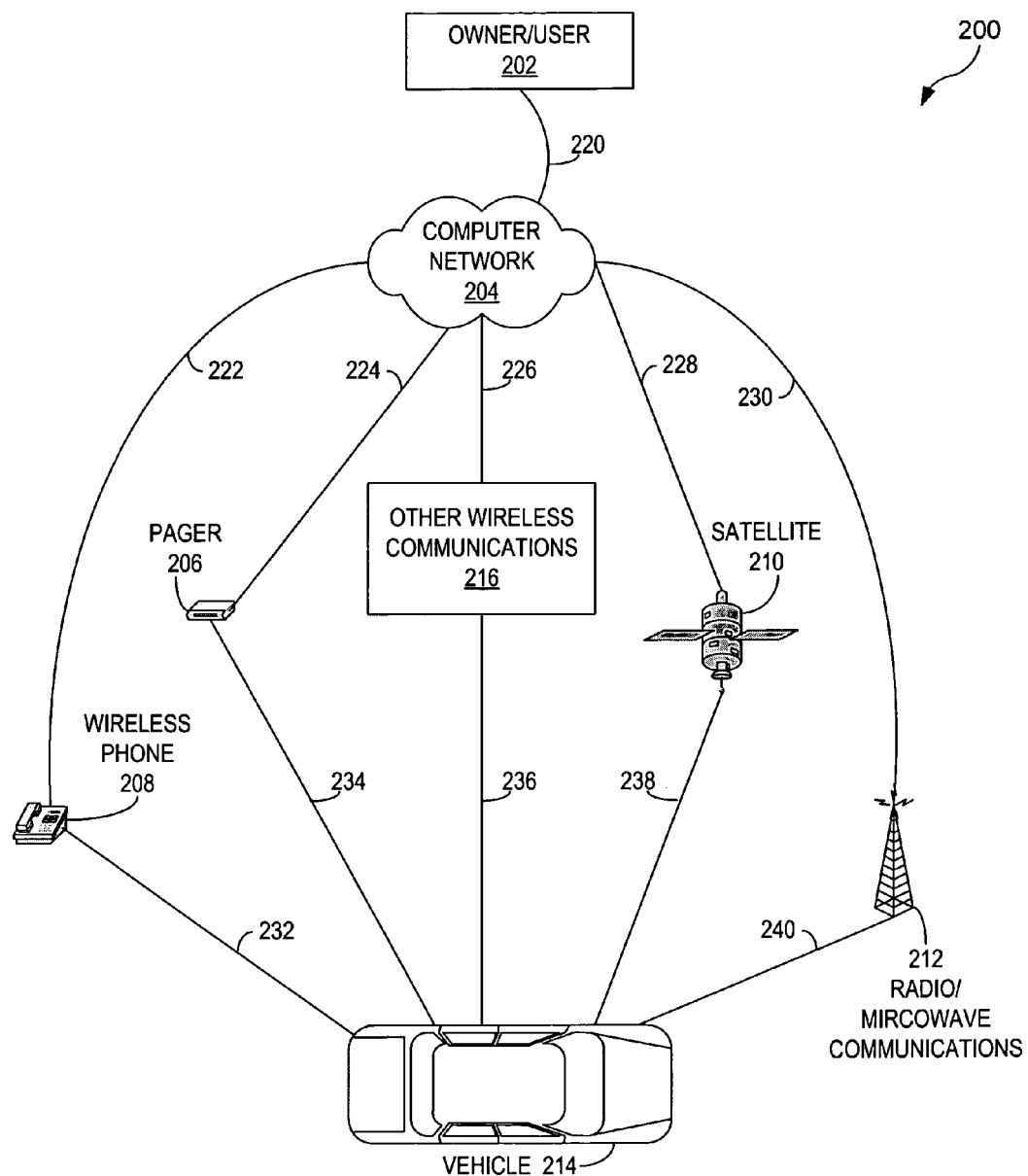
FIG. 2 is a block diagram depicting the communication system for a vehicle.

Referring to FIG. 2 of the drawings, the reference numeral 200 generally designates the communication system for a vehicle. The communication system 200 comprises a vehicle 214, a wireless phone interface 208, a pager interface 206, a satellite interface 210, a radio/microwave interface 212, a computer network 204, and an owner/user 202. There are a variety of remote communications that can take place between an owner/user 202 and a vehicle 214. For example, in a proactive model, an owner/user 202 can remotely enable as described in FIG. 1.

However, in order for any remote communication to exist between an owner/user 202 and a vehicle 214 there are a variety of connections that could be established. The user/owner 202 is coupled to the computer network 204 through a fifth communications channel 220. The computer network 204 is coupled to the wireless phone interface 208 through a sixth communications channel 222. The computer network 204 is also connected to the pager interface 206 through a seventh communications channel 224. The computer network 204 is also coupled to the other wireless communications interface 216 through an eighth communication channel 226. The computer network 204 is also coupled to the satellite interface 110 through a ninth communications channel 228. The computer network 204 is also coupled to the radio/microwave interface 212 through a tenth communications channel 230. The wireless phone interface 208 is coupled to the vehicle 214 through an eleventh communications channel 232. The pager interface 206 is coupled to the vehicle 214 through a twelfth communications channel 234. The other wireless communications interface 216 is coupled to the vehicle 214 through a thirteenth communications channel 236. The satellite interface 210 is coupled to the vehicle 214 through a fourteenth communications channel 238. The radio/microwave interface 212 is coupled to the vehicle 214 through a fifteenth communications channel 240. There can be a single communications channel or multiple communications channels, as shown in FIG. 2, to the vehicle 214. Also, the computer network can be any type of computer network including, but not limited to, the Internet. Moreover, any of the aforementioned communications channels would encompass wireless links, optical links, conductor cable links, packet switched channels, direct communication channels, and any combination thereof.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

The invention claimed is:

1. An apparatus for remotely controlling vehicle ignition, comprising:

a processor for initiating vehicle ignition or for disabling vehicle ignition, wherein the processor is at least configured to at least require that at least one predetermined, enumerated condition is at least satisfied, wherein the at least one predetermined, enumerated condition is at least based on a history of usage;

a plurality of receivers at least configured to be coupled to the processor, wherein the plurality of receivers are at least configured to receive wireless data;

a plurality of transmitters at least configured to be coupled to the processor, wherein the plurality of transmitters are at least configured to transmit wireless data;

a manual ignition system at least configured to be coupled to the processor, wherein the manual ignition system at least allows a physical occupant of the vehicle to at least attempt vehicle ignition;

wherein the processor is further configured to automatically enable or disable vehicle ignition based on enabling or disabling of the manual ignition system; and a vehicle ignition system at least coupled to the processor, wherein the vehicle ignition system is configured to at least physically enable ignition and at least physically disable ignition.

2. The apparatus of claim 1, wherein at least one receiver of the plurality of receivers is a Global Positioning System (GPS) receiver.

3. The apparatus of claim 1, wherein at least one receiver of the plurality of receivers is a pager network receiver.

4. The apparatus of claim 1, wherein at least one receiver of the plurality of receivers is a cellular network receiver.

5. The apparatus of claim 1, wherein at least one receiver of the plurality of receivers is a satellite receiver.

6. The apparatus of claim 1, wherein at least one transmitter of the plurality of transmitters is a pager network transmitter.

7. The apparatus of claim 1, wherein at least one transmitter of the plurality of transmitters is a cellular network transmitter.

8. The apparatus of claim 1, wherein at least one transmitter of the plurality of transmitters is a satellite transmitter.

9. The apparatus of claim 1, wherein the processor is further configured:
to at least determine safe locations based on historical vehicle enablement;
for a user or owner to at least remotely program safe locations; and
for a user or owner to at least remotely predefine conditions for vehicle enablement.

10. The apparatus of claim 1, wherein the at least one predetermined condition is selected from the group comprising geographical area, time of usage, and user.

11. A method for remotely controlling vehicle ignition, comprising:
receiving at least one condition for enablement;
manually enabling or disabling of a manual ignition switch by a physical occupant;
determining if the at least one condition is satisfied;
if the at least one condition is satisfied, then enabling a vehicle ignition switch;
if the at least one condition is not satisfied, then allowing the vehicle to remain disabled; and
wherein the receiving at least one condition for enablement further comprises:
compiling a history of usage;
determining safe zones based on the history; and
automatically enabling or disabling based on manual enabling or disabling of a manual ignition switch by a physical occupant.

12. The method of claim 11, wherein the at least one condition is selected from the group comprising geographical area, time of usage, and user.

13. The method of claim 11, wherein the receiving at least one condition is at least configured to be input by an owner or user remotely.

14. The method of claim 11, wherein the receiving at least one condition for enablement further comprises:
receiving an authorization code;
authenticating the authorization code;
if the authorization code is authentic, then accepting at least one condition for enablement;
if the authorization code is not authentic, then disregarding the at least one condition for enablement.

15. The method of claim 14, wherein the at least one condition for enablement is selected from the group comprising a immediate stop command, geographical constraint, and time constraint.

16. A computer program product for remotely controlling vehicle ignition, the computer program product having a medium with a computer program embodied thereon, the computer program comprising:
computer code for receiving at least one condition for enablement;
manually enabling or disabling of a manual ignition switch by a physical occupant;
computer code for determining if the at least one condition is satisfied;
computer code for, if the at least one condition is satisfied, then enabling a vehicle ignition switch;
computer code for, if the at least one condition is not satisfied, then allowing the vehicle to remain disabled; and
wherein the computer code for receiving at least one condition for enablement further comprises:
computer code for compiling a history of usage;
computer code for determining safe zones based on the history; and
computer code for automatically enabling or disabling based on manual enabling or disabling of a manual ignition switch by a physical occupant.

17. The computer program product of claim 16, wherein the at least one condition is selected from the group comprising geographical area, time of usage, and user.

18. The computer program product of claim 16, wherein the receiving at least one condition is at least configured to be input by an owner or user remotely.

19. The computer program product of claim 16, wherein the receiving at least one condition for enablement further comprises:
computer code for receiving an authorization code;
computer code for authenticating the authorization code;
computer code for, if the authorization code is authentic, then accepting at least one condition for enablement; and
computer code for, if the authorization code is not authentic, then disregarding the at least one condition for enablement.

20. The computer program product of claim 19, wherein the at least one condition for enablement is selected from the group comprising an immediate stop command, a geographical constraint, and a time constraint.

* * * * *